United States Patent [19]
Bartholomay

[11] Patent Number: 6,099,219
[45] Date of Patent: Aug. 8, 2000

[54] ATV TIE DOWN RACK SYSTEM

[75] Inventor: William S. Bartholomay, Comstock, Minn.

[73] Assignee: David L. Koop, St. Cloud, Minn.

[21] Appl. No.: 09/340,083

[22] Filed: Jun. 25, 1999

[51] Int. Cl.⁷ ..................................................... B60P 7/08
[52] U.S. Cl. .................................. 410/20; 410/2; 410/3; 410/9; 410/10
[58] Field of Search .................................. 410/2, 3, 4, 7, 410/9, 10, 11, 12, 19, 20, 21, 23, 30; 248/499, 500, 503

[56] References Cited

U.S. PATENT DOCUMENTS

| | | | |
|---|---|---|---|
| 5,593,260 | 1/1997 | Zimmermen | 410/20 |
| 5,658,106 | 8/1997 | Dickerson, Sr. | 410/20 |
| 5,747,685 | 5/1998 | Hain | 410/7 |
| 5,816,757 | 10/1998 | Huston | 410/3 |
| 5,833,412 | 11/1998 | Valencia et al. | 410/2 |

*Primary Examiner*—Stephen T. Gordon
*Attorney, Agent, or Firm*—Michael S. Neustel

[57] ABSTRACT

An ATV tie down rack system for securing an ATV to a trailer or the bed of a pickup without requiring tie-down straps. The inventive device includes a tube member, a center bracket having two apertures extending from the tube member, a first support member attached to the tube member, a second support member attached to the tube member opposite of the first support member, a catch member having a U-shape rotatably positioned within the tube member, a pair of angled members extending orthogonally from the distal ends of the catch member, a first ratchet having a first strap, and a second ratchet having a second strap. The first strap and the second strap are slidably attached to the catch member and the angled members for allowing them to be easily moved away from the path of the tire of the ATV. The first ratchet and the second ratchet are utilized to tighten the respective straps about the tires of the ATV thereby retaining the ATV upon the trailer or pickup. The pair of apertures within the center bracket allow the tube member to be attached utilizing a threaded shaft as is commonly found in a snowmobile trailer, or conventional fasteners may be inserted through the apertures for retaining the tube member in the desired location such as the bed of a pickup. The first support member and the second support member preferably have a V-portion for snugly receiving the tires of the ATV.

19 Claims, 3 Drawing Sheets

ATV TIE DOWN RACK SYSTEM

BACKGROUND OF THE INVENTION

1. Field of the Invention

The present invention relates generally to all terrain vehicles (ATV) and more specifically it relates to an ATV tie down rack system for securing an ATV or a golf cart to a trailer or the bed of a pickup without requiring tie-down straps.

2. Description of the Prior Art

Tie-down straps have been in use for years. The user generally secures two or more tie-down straps between the frame of the ATV and the trailer or pickup. The user tightens the straps thereby compressing the suspension system of the vehicle for extended periods of time.

However, most ATV suspension systems are not designed to be constantly compressed for extended periods of time, thereby resulting in significant damage to the suspension components such as the shocks and compression springs. Hence, there is a need for a system that will allow an individual to secure an ATV within a trailer or pickup without damaging the ATV suspension components.

Examples of attempted ATV securing systems include U.S. Pat. No. 5,59,3,260 to Zimmerman; U.S. Pat. No. 5,294,221 to Eller et al.; U.S. Pat. No. 4,968,052 to Alm et al.; U.S. Pat. No. 5,011,347 to Bullock; U.S. Pat. No. 1,906,022 to Tobin; U.S. Pat. No. 4,761,015 to Carr; U.S. Pat. No. 4,786,223 to Crissey et al.; U.S. Pat. No. 5,540,540 to Peterson which are all illustrative of such prior art.

Zimmerman (U.S. Pat. No. 5,593,260) discloses an apparatus for securing a vehicle to a trailer. Zimmerman teaches a cylindrical sleeve, a pair of stop bars connected to the sleeve, a lift bar rotationally positioned within the cylindrical sleeve, and a pair of chains attached to the lift bar for attaching about a pair of tires of the ATV.

Eller et al. (U.S. Pat. No. 5,294,221) discloses an adjustable vehicle wheel restraint. Eller et al teaches a base plate having a wheel plate assembly, a pair of outwardly angled wheel plates, and a tire belt.

Alm et al. (U.S. Pat. No. 4,968,052) discloses a wheel lift apparatus. Alm et al. teaches a crossbar, two collars, two wheel retainer locating struts, and two wheel retainers.

While these devices may be suitable for the particular purpose to which they address, they are not as suitable for securing an ATV to a trailer or the bed of a pickup without requiring tie-down straps. Conventional tie-down straps compress the suspension thereby causing permanent damage to shocks and suspension springs.

In these respects, the ATV tie down rack system according to the present invention substantially departs from the conventional concepts and designs of the prior art, and in so doing provides an apparatus primarily developed for the purpose of securing an ATV to a trailer or the bed of a pickup without requiring tie-down straps.

SUMMARY OF THE INVENTION

In view of the foregoing disadvantages inherent in the known types of ATV securing devices now present in the prior art, the present invention provides a new ATV tie down rack system construction wherein the same can be utilized for securing an ATV to a trailer or the bed of a pickup without requiring tie-down straps.

The general purpose of the present invention, which will be described subsequently in greater detail, is to provide a new ATV tie down rack system that has many of the advantages of the ATV securing devices mentioned heretofore and many novel features that result in a new ATV tie down rack system which is not anticipated, rendered obvious, suggested, or even implied by any of the prior art ATV securing devices, either alone or in any combination thereof.

To attain this, the present invention generally comprises a tube member, a center bracket having two apertures extending from the tube member, a first support member attached to the tube member, a second support member attached to the tube member opposite of the first support member, a catch member having a U-shape rotatably positioned within the tube member, a pair of angled members extending orthogonally from the distal ends of the catch member, a first ratchet having a first strap, and a second ratchet having a second strap. The first strap and the second strap are slidably attached to the catch member and the angled members for allowing them to be easily moved away from the path of the tire of the ATV. The first ratchet and the second ratchet are utilized to tighten the respective straps about the tires of the ATV hereby retaining the ATV upon the trailer or pickup. The pair of apertures within the enter bracket allow the tube member to be attached utilizing a threaded shaft as is commonly found in a snowmobile trailer, or conventional fasteners may be inserted through the apertures for retaining the tube member in the desired location such as the bed of a pickup. The first support member and the second support member preferably have a V-portion for snugly receiving the tires of the ATV.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an ATV tie down rack system that will overcome the shortcomings of the prior art devices.

Another object is to provide an ATV tie down rack system that allows an individual to load and secure an ATV within a trailer or pickup.

An additional object is to provide an ATV tie down rack system that extends the useful life of suspension components.

A further object is to provide an ATV tie down rack system that can be secured upon a trailer or within a bed of a pickup.

Another object is to provide an ATV tie down rack system that is of a simple lightweight construction for allowing an individual to easily remove and attach.

An additional object is to provide an ATV tie down rack system that does not compress the suspension of an ATV.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
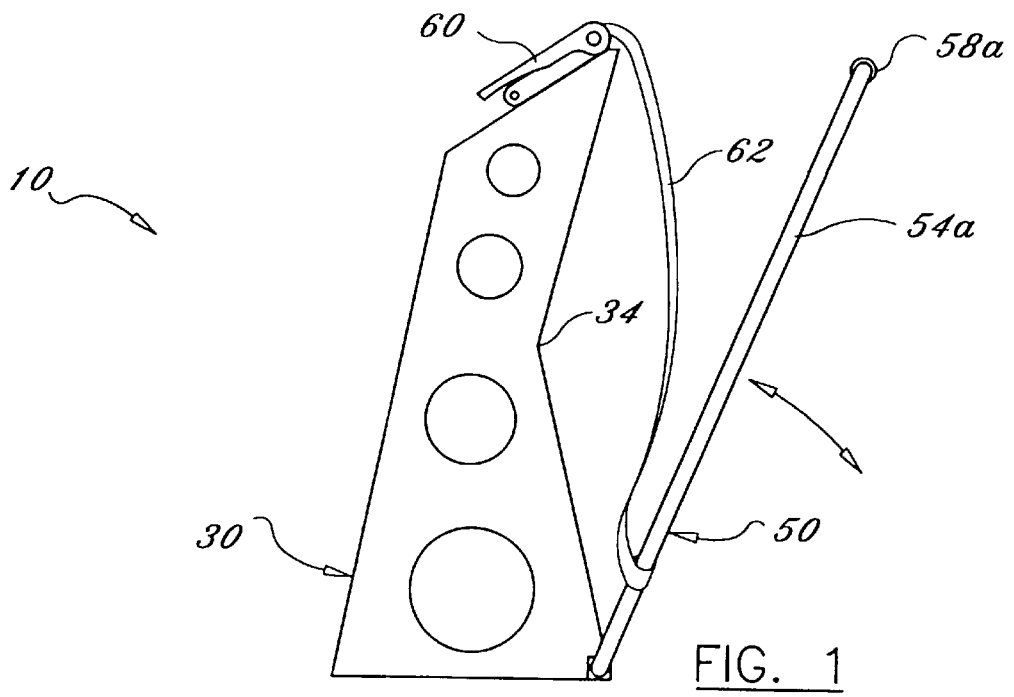
FIG. 1 is a left side view of the present invention.

Turning now descriptively to the drawings, in which similar reference characters denote similar elements throughout the several view, FIGS. 1 through 4 illustrate an ATV tie down rack system 10, which comprises a tube member 20, a center bracket 22 having two apertures 24 extending from the tube member 20, a first support member 30 attached to the tube member 20, a second support member 40 attached to the tube member 20 opposite of the first support member 30, a catch member 50 having a U-shape rotatably positioned within the tube member 20, a pair of angled members 56a–b extending orthogonally from the distal ends of the catch member 50, a first ratchet 60 having a first strap 62, and a second ratchet 70 having a second strap 72. The first strap 62 and the second strap 72 are slidably attached to the catch member 50 and the angled members 56a–b for allowing them to be easily moved away from the path of the tire 12 of the ATV 14. The first ratchet 60 and the second ratchet 70 are utilized to tighten the respective straps about the tires 12 of the ATV 14 thereby retaining the ATV 14 upon the trailer 16 or pickup. The pair of apertures 24 within the center bracket 22 allow the tube member 20 to be attached utilizing a threaded shaft as is commonly found in a snowmobile trailer 16, or conventional fasteners may be inserted through the apertures 24 for retaining the tube member 20 in the desired location such as the bed of a pickup. The first support member 30 and the second support member 40 preferably have a V-portion for snugly receiving the tires 12 of the ATV 14.

Figure 2:
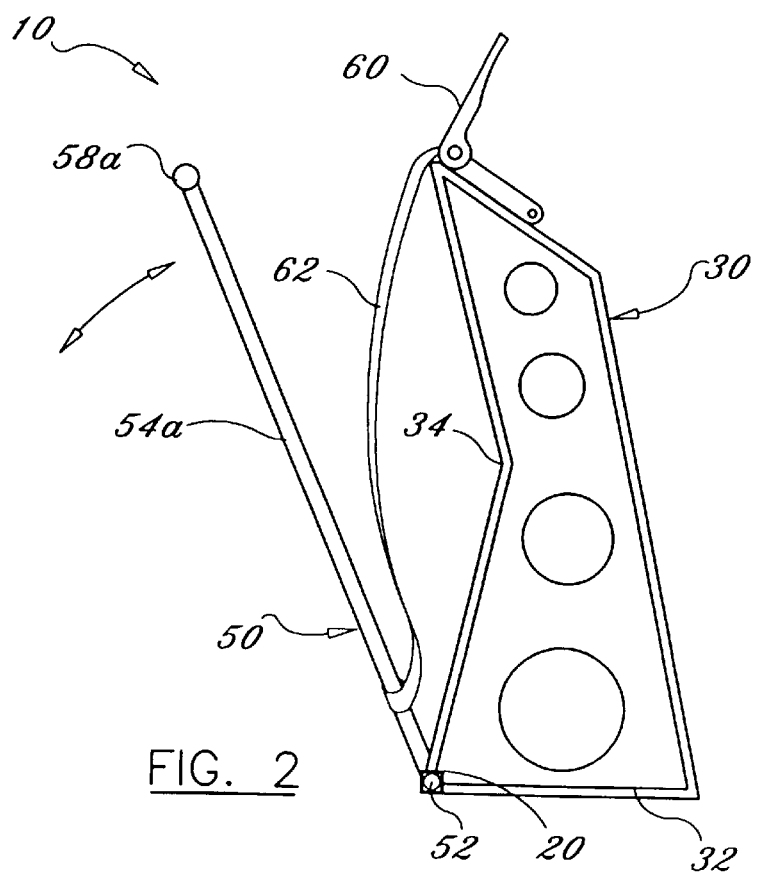
FIG. 2 is a cutaway view of the present invention showing the left support member.
Figure 3:
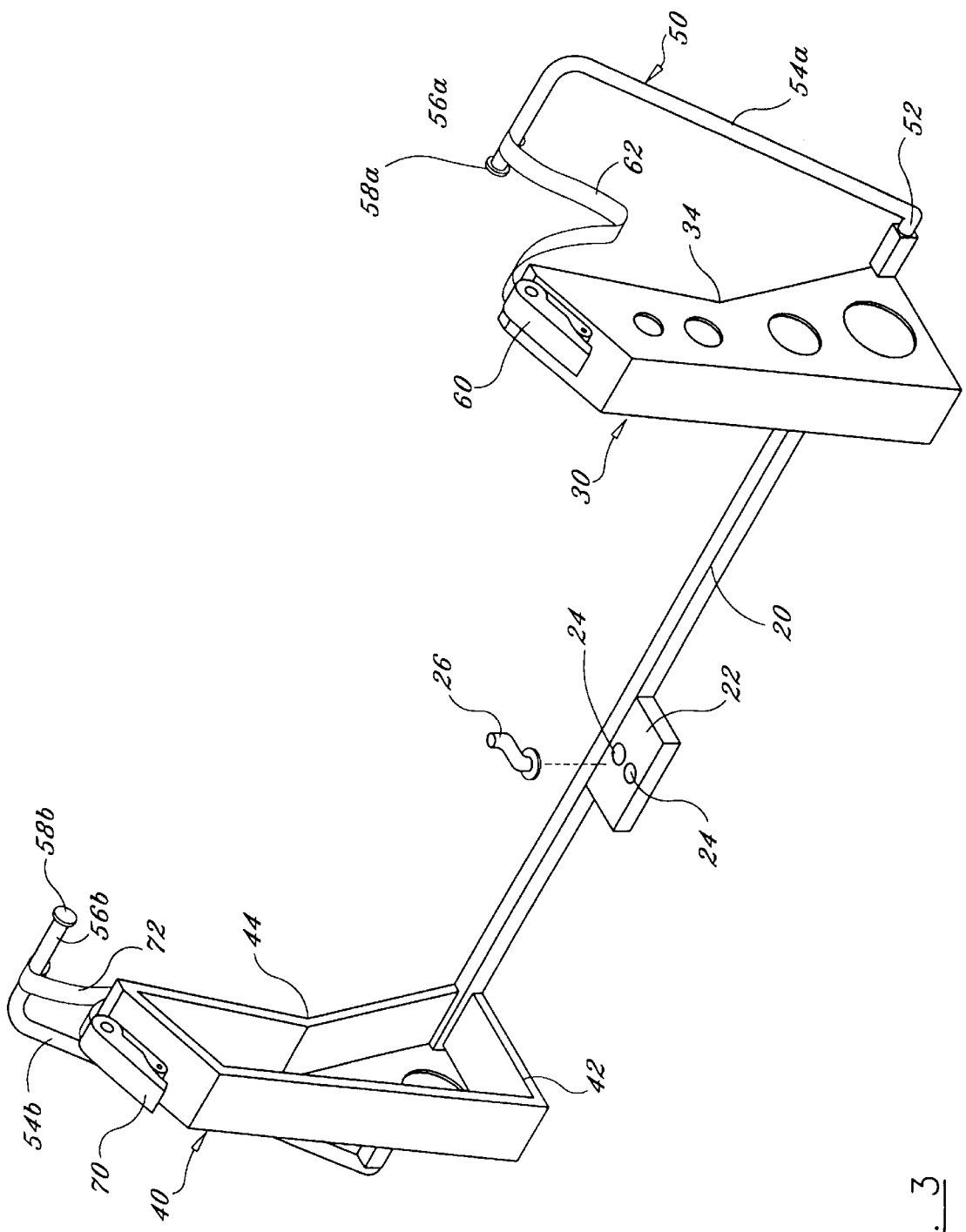
FIG. 3 is an upper perspective view of the present invention.

As best shown in FIG. 3 of the drawings, an elongate tube member 20 is provided for attachment to a trailer 16. As shown in FIG. 2 of the drawings, the tube member 20 preferably has a rectangular cross-sectional area, however it can be appreciated by one skilled in the art that any well-known shape may be utilized.

As shown in FIG. 3 of the drawings, a center bracket 22 is centrally attached to the tube member 20. The center bracket 22 includes at least two apertures 24 for attachment to a conventional snowmobile trailer 16 or within a pickup. If utilized upon a conventional snowmobile trailer 16, a connecting handle 26 having an interiorly threaded portion is provided for threadably engaging a threaded shaft extending from the trailer 16. Alternatively, the user can utilize conventional fasteners for securing the tube member 20 to the trailer 16 or within a bed of a pickup by inserting the fasteners through the pair of aperture s 24. The conventional fasteners may be comprised of threaded screws or bolts. The pair of apertures 24 thereby prevent rotational movement of the invention while attached.

As best shown in FIG. 3 of the drawings, a first support member 30 is attached to an end of the tube member 20. The first support member 30 includes a first base 32 extending parallel to the tube member 20. The first support member 30 also includes a first V-portion 34 facing in a direction so that tire 12 of the ATV 14 will engage the first V-portion 34. The first support member 30 also includes a first vertical member attached to the first base 32 and thereafter angling toward and engaging the first V-portion 34 forming a closed loop structure. A first side plate is preferably attached to the first base 32, first V-portion 34 and first vertical member for strengthening the first support member 30. The first support member 30 may be constructed of any well-known material.

As best shown in FIG. 3 of the drawings, a second support member 40 is attached to an end of the tube member 20 opposite of the first support member 30. The second support member 40 includes a second base 42 extending parallel to the tube member 20. The second support member 40 also includes a second V-portion 44 facing in a direction so that tire 12 of the ATV 14 will engage the second V-portion 44. The second support member 40 also includes a second vertical member attached to the second base 42 and thereafter angling toward and engaging the second V-portion 44 forming a closed loop structure. A second side plate is preferably attached to the second base 42, second V-portion 44 and second vertical member for strengthening the second support member 40. The second support member 40 may be constructed of any well-known material.

As shown in FIGS. 1 through 4, a catch member 50 is rotatably positioned within the tube member 20. The catch member 50 includes a center member 52 that rotationally extends through the tube member 20 as shown in FIG. 2 of the drawings. A pair of side members 54a–b are attached to opposing ends of the center member 52 and extend substantially orthogonally there from. As best shown in FIG. 3 of the drawings, a pair of angled members 56a–b extend substantially orthogonally from the distal ends of the pair of side members 54a–b. A corresponding pair of flanged ends 58a–b are attached to the distal ends of the angled members 56a–b. In an alternative embodiment, the pair of angled members 56a–b extend to engage one another thereby forming a single solid member without an opening there between.

As best shown in FIG. 3 of the drawings, a first ratchet 60 is secured to an upper portion of said first support member 30. A first strap 62 is mechanically positioned within said first ratchet 60 and has a distal looped end. The distal looped end is slidably positioned about the catch member 50 and is retained by the flanged end 58a. The first strap 62 is slidably positioned upon the angled member 56a and the corresponding side member 54a for allowing the first strap 62 to be moved away from the path of the tire 12. The strap is preferably of a flat material.

As best shown in FIG. 3 of the drawings, a second ratchet 70 is secured to an upper portion of said second support member 40. A second strap 72 is mechanically positioned within said second ratchet 70 and has a distal looped end. The distal looped end is slidably positioned about the catch member 50 and is retained by the flanged end 58a. The second strap 72 is slidably positioned upon the angled member 56a and the corresponding side member 54a for allowing the second strap 72 to be moved away from the path of the tire 12. The strap is preferably of a flat material.

Figure 4:
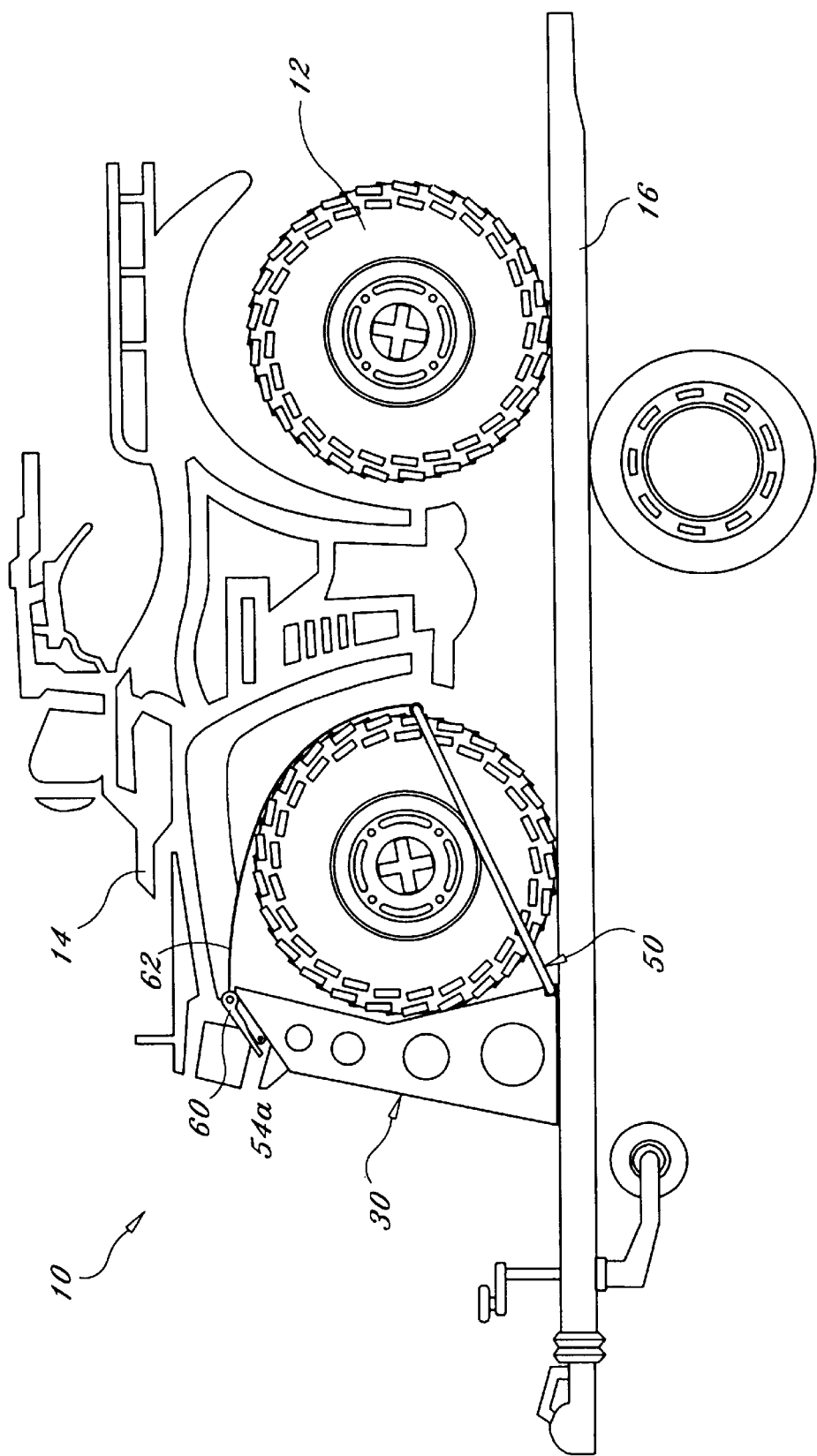
FIG. 4 is a left side view of the present invention attached to a trailer with an ATV secured within.

In use, the user positions the center bracket 22 about the threaded fastener extending from the conventional snowmobile trailer 16. The user then threadably engages the connecting handle 26 about the threaded fastener for retaining the center bracket 22 adjacent the trailer 16. If the trailer 16 does not have a threaded fastener or the user is attaching the invention with a pickup, conventional fasteners are inserted through the apertures 24 within the center bracket 22 for engaging the bed of the pickup or trailer 16. The user then loosens the straps 62, 72 sufficiently and then moves the straps 62, 72 away from the path of the tires 12 of the ATV 14. The user then drives the ATV 14 upon the trailer 16 or pickup thereby passing the front wheels over the angled members 56a–b until the tires 12 engage the support members 30, 40. The V-portions 34, 44 of the support members 30, 40 snugly engage a significant portion of the tires 12 of the ATV 14. The user then positions the straps 62, 72 over the upper portion of the tires 12 of the ATV 14 as shown in FIG. 4 of the drawings. The user then manipulates the ratchets 60, 70 so that the straps 62, 72 are tightened about the upper portion of the tires 12. The user continues tightening the straps until the catch member 50 is elevated to a snug engagement with the tires 12 as shown in FIG. 4 of the drawings. The tires 12 of the ATV 14 are snugly retained between the catch member 50 and the support members 30, 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ATV tie down rack system, comprising:
   a tube members having a lumen;
   a center bracket having at least two apertures attached to said tube member for securing to a trailer or bed of a pickup;
   a catch member pivotally positioned within said tube member;
   a first support member attached to an end of said tube member;
   a first strap having a first loop, wherein said first loop is slidably positioned about said catch member;
   a first tightening means secured to said first support member for engaging and tightening said first strap;
   a second support member attached to an end of said tube member;
   a second strap having a second loop, wherein said second loop is slidably positioned about said catch member; and
   a second tightening means secured to said second support member for engaging and tightening said second strap.

2. The ATV tie down rack system of claim 1, wherein said catch member comprises:
   a center member rotatably positioned within said tube member;
   a pair of side members extending from opposing ends of said center member; and
   a pair of angled members extending from distal ends of said pair of side members.

3. The ATV tie down rack system of claim 1, wherein said first tightening means and said second tightening means each comprise a ratchet.

4. The ATV tie down rack system of claim 1, wherein said first support member and said second support member each comprise:
   a base;
   a V-portion attached to said base for facing an ATV; and
   a vertical member attached to said base, wherein said vertical member angles toward and engages said V-portion.

5. The ATV tie down rack system of claim 2, wherein each of said angled members have a flanged end for preventing removal of said first strap and said second strap.

6. The ATV tie down rack system of claim 1, wherein said first strap and said second strap are comprised of a flat structure.

7. The ATV tie down rack system of claim 1, including a connecting handle for securing about a threaded member from a trailer.

8. The ATV tie down rack system of claim 4, wherein said pair of support members further include a side member attached to said base and said V-portion.

9. The ATV tie down rack system of claim 1, wherein said tube member has a rectangular cross-sectional area.

10. The ATV tie down rack system of claim 1, wherein said at least two apertures within said center bracket comprise two apertures.

11. The ATV tie down rack system of claim 1, wherein said catch member comprises:
    a center member rotatably positioned within said tube member;
    a pair of side members extending from opposing ends of said center member; and
    a respective cross member extending from each distal end of said pair of side members.

12. The ATV tie down rack system of claim 11, wherein said first tightening means and said second tightening means each comprise a ratchet.

13. The ATV tie down rack system of claim 11, wherein said first support member and said second support member each comprise:
    a base;
    a V-portion attached to said base for facing an ATV; and
    a vertical member attached to said base, wherein said vertical member angles toward and engages said V-portion.

14. The ATV tie down rack system of claim 11, wherein said first strap and said second strap are comprised of a flat structure.

15. The ATV tie down rack system of claim 11, including a connecting handle for securing about a threaded member from a trailer.

16. The ATV tie down rack system of claim 13, wherein said pair of support members further include a side member attached to said base and said V-portion.

17. The ATV tie down rack system of claim 11, wherein said tube member has a rectangular cross-sectional area.

18. The ATV tie down rack system of claim 11, wherein said at least two apertures within said center bracket comprise two apertures.

19. An ATV tie down rack system, comprising:

a tube member having a lumen;

a center bracket attached to said tube member for securing to a trailer or bed of a pickup;

a catch member pivotally positioned within said tube member;

a first support member attached to an end of said tube member;

a first strap having a first loop, wherein said first loop is slidably positioned about said catch member;

a first tightening means secured to said first support member for engaging and tightening said first strap;

a second support member attached to an end of said tube member;

a second strap having a second loop, wherein said second loop is slidably positioned about said catch member; and a second tightening means secured to said second support member for engaging and tightening said second strap.

* * * * *